United States Patent
Kolhouse et al.

(10) Patent No.: US 12,448,911 B2
(45) Date of Patent: Oct. 21, 2025

(54) SYSTEMS AND METHODS TO MINIMIZE EXHAUST SYSTEM CONDENSATION

(71) Applicants: Cummins Inc., Columbus, IN (US); Tula Technology, Inc., San Jose, CA (US)

(72) Inventors: J. Steven Kolhouse, Columbus, IN (US); David Schmidt, Indianapolis, IN (US); David J. Langenderfer, Columbus, IN (US)

(73) Assignees: Cummins Inc., Columbus, IN (US); Tula Technology, Inc, San Jose, CA (US)

( * ) Notice: Subject to any disclaimer, the term of this patent is extended or adjusted under 35 U.S.C. 154(b) by 0 days.

(21) Appl. No.: 18/854,946

(22) PCT Filed: Apr. 7, 2023

(86) PCT No.: PCT/US2023/017935
§ 371 (c)(1),
(2) Date: Oct. 7, 2024

(87) PCT Pub. No.: WO2023/196627
PCT Pub. Date: Oct. 12, 2023

(65) Prior Publication Data
US 2025/0250921 A1    Aug. 7, 2025

Related U.S. Application Data

(60) Provisional application No. 63/329,227, filed on Apr. 8, 2022.

(51) Int. Cl.
*F01N 9/00*    (2006.01)
(52) U.S. Cl.
CPC ............ *F01N 9/00* (2013.01); *F01N 2900/08* (2013.01); *F01N 2900/1602* (2013.01); *F01N 2900/1628* (2013.01)

(58) Field of Classification Search
CPC .... F01N 9/00; F01N 2900/08; F01N 2900/10; F01N 2900/1602; F01N 2900/1628
See application file for complete search history.

(56) References Cited

U.S. PATENT DOCUMENTS

| 9,371,783 B2 | 6/2016 | Surnilla et al. |
| 10,161,325 B2 | 12/2018 | Zur Loye et al. |

(Continued)

FOREIGN PATENT DOCUMENTS

| DE | 102020101069 A1 * | 7/2021 | ............. F01N 3/005 |
| JP | 2008190341 A * | 8/2008 | |

OTHER PUBLICATIONS

Aniekan etal. "Engineering material selection for automotive exhaust systems using CES software." International Journal of Engineering Technologies IJET 3.2 (2017): 50-60. Retrieved on May 23, 2023 (May 23, 2023) from https://dergipark.org.tr/en/pub/ijet/article/282847> entire document.

(Continued)

*Primary Examiner* — Ngoc T Nguyen
(74) *Attorney, Agent, or Firm* — Foley & Lardner LLP

(57) ABSTRACT

A system including an exhaust aftertreatment system and a controller coupled to an engine and the exhaust aftertreatment system is provided. The controller is configured to: receive information including at least one of environmental information or operating information regarding the system; determine that a condensation state is present in the exhaust aftertreatment system based on the environmental information and the temperature associated with the exhaust system; and responsive to determining that the condensation state is present, command the engine to operate in a cylinder deactivation mode whereby at least one cylinder of a plurality of cylinders of the engine is deactivated.

20 Claims, 6 Drawing Sheets

(56) References Cited

U.S. PATENT DOCUMENTS

| | | |
|---|---|---|
| 10,794,307 B2 | 10/2020 | Reynolds et al. |
| 2003/0121249 A1 | 7/2003 | Foster et al. |
| 2006/0117754 A1 | 6/2006 | Hunt |
| 2009/0084083 A1 | 4/2009 | Vachon et al. |
| 2011/0023842 A1 | 2/2011 | Kurtz |
| 2011/0224851 A1 | 9/2011 | Jacques et al. |

OTHER PUBLICATIONS

Beauregard, Garrett. "Findings of Hydrogen Internal Combustion Engine Durability", Electric Transportation Engineering Corporation. Mar. 31, 2011, 65 pages.
PCT Int Search Report and Written Opinion dtd Jul. 19, 2023 re Appl No. PCT/US2023/017935 filed Apr. 7, 2023.

\* cited by examiner

SYSTEMS AND METHODS TO MINIMIZE EXHAUST SYSTEM CONDENSATION

CROSS-REFERENCE TO RELATED APPLICATIONS

This application is a U.S. National Stage Application of International Application No. PCT/US2023/017935, filed Apr. 7, 2023, which claims the benefit of and priority to U.S. Provisional Patent Application No. 63/329,227, filed Apr. 8, 2022, both of which are incorporated herein by reference in their entireties and for all purposes.

TECHNICAL FIELD

The present disclosure relates to systems and methods for minimizing condensation in an exhaust aftertreatment system. More particularly, the systems and methods of the present disclosure relate to utilizing cylinder deactivation (CDA) to minimize, reduce, or otherwise mitigate condensation within the exhaust aftertreatment system.

BACKGROUND

Engine exhaust systems (e.g., catalytic converter, muffler, etc.) are exposed to significant condensation during various operating conditions, such as cold-starts and cold ambient operating conditions. Condensation in the exhaust system can expose a catalyst to moisture that can contaminate and degrade performance of the catalyst. This can lead to undesired exhaust emissions (e.g., Nitrous Oxides or NOx) above a predefined limit. Thus, mitigating the adverse effects of condensation are desirable in order to prolong operation of and attempt to ensure desired operation of the exhaust aftertreatment system.

SUMMARY

One embodiment relates to a system including an exhaust aftertreatment system and a controller coupled to an engine and the exhaust aftertreatment system. The controller is configured to: receive information comprising at least one of environment information or operating information regarding the system; determine that a condensation state is present in the exhaust aftertreatment system based on the information; and responsive to determining that the condensation state is present, command the engine to operate in a cylinder deactivation mode whereby at least one cylinder of a plurality of cylinders of the engine is deactivated.

Another embodiment relates to a method. The method includes: receiving information including at least one of environmental information or operating information regarding the system; determining that a condensation state is present in the exhaust aftertreatment system based on the information; and responsive to determining that the condensation state is present, commanding the engine to operate in a cylinder deactivation mode whereby at least one cylinder of a plurality of cylinders of the engine is deactivated.

Another embodiment relates to a system. The system may be structured to reduce condensation in an exhaust aftertreatment system. The system includes a processor, and a memory coupled to the processor, the memory storing instructions therein that, when executed by the processor, cause operations including: receiving environmental information regarding the system; receiving information regarding a temperature associated with the exhaust aftertreatment system; determining a condensation temperature regarding the exhaust aftertreatment system based on at least one of the environmental information or the temperature regarding the exhaust aftertreatment system; comparing the temperature regarding the exhaust aftertreatment system to the condensation temperature; determining a firing density for a cylinder deactivation operating mode for an engine coupled to the exhaust aftertreatment system based on the comparison; and implementing the determined firing density with the engine during a cylinder deactivation mode.

This summary is illustrative only and is not intended to be in any way limiting. These and other features, together with the organization and manner of operation thereof, will become apparent from the following detailed description when taken in conjunction with the accompany drawings.

The described features, structures, advantages, and/or characteristics of the subject matter of the present disclosure may be combined in any suitable manner in one or more embodiments and/or implementations. In this regard, numerous specific details are provided to impart a thorough understanding of embodiments of the subject matter of the present disclosure. The described features of the subject matter of the present disclosure may be combined in any suitable manner in one or more embodiments and/or implementations. In this regard, one or more features of an aspect of the invention may be combined with one or more features of a different aspect of the invention. Moreover, additional features may be recognized in certain embodiments and/or implementations that may not be present in all embodiments or implementations. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Figure 1:
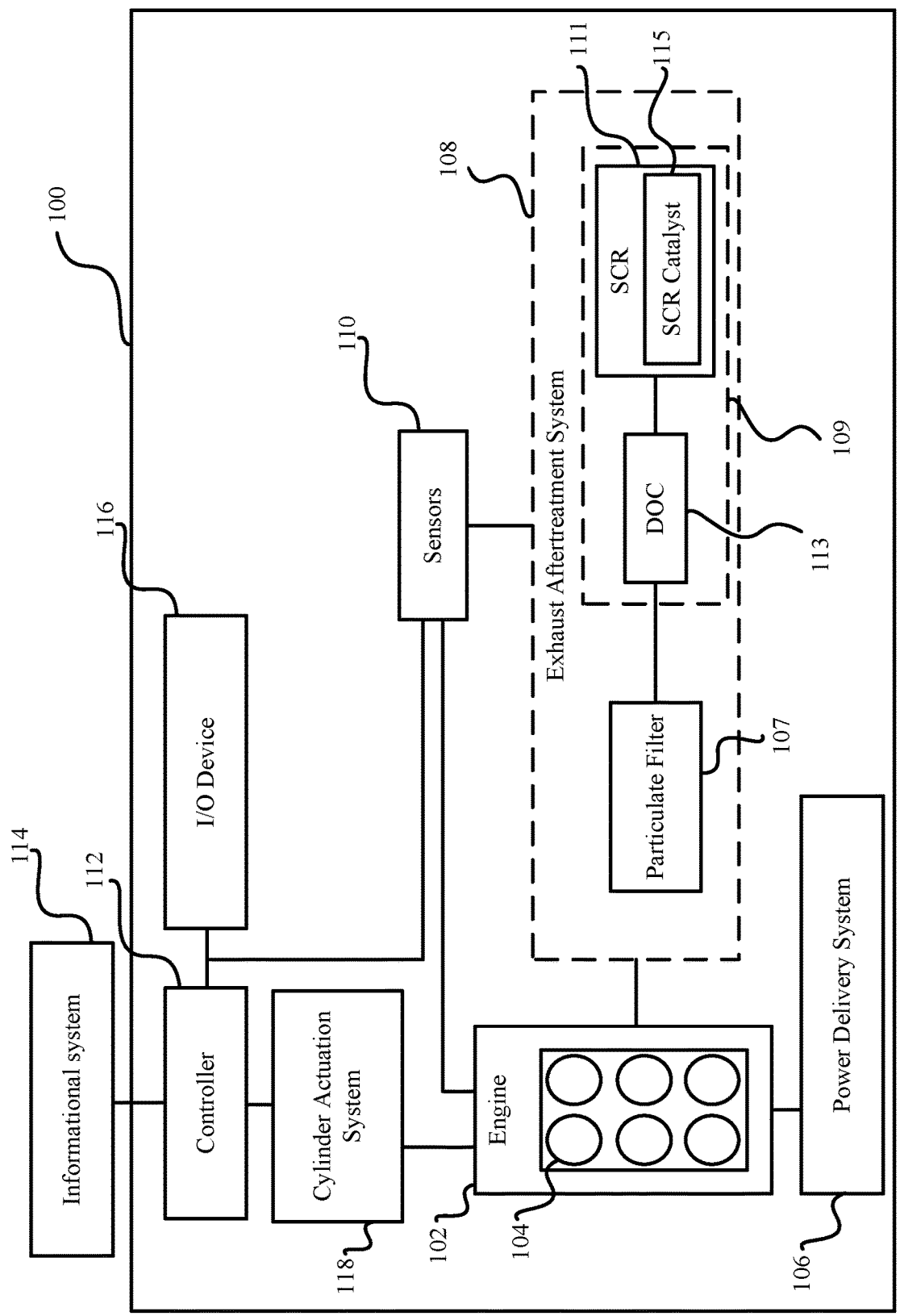
FIG. 1 is a schematic diagram of an engine system with a controller, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the FIGURES, the various embodiments disclosed herein relate to systems, apparatuses, and methods for employing a cylinder deactivation operating mode for an engine to control the temperature of exhaust gas and/or system component temperatures to minimize condensation within an engine exhaust system are provided according to various embodiments here. Cylinder deactivation (CDA) mode is a broad term that encompasses various related but distinct cylinder deactivation operating modes. A first type of CDA operating mode is known as "fixed cylinder CDA." In fixed cylinder CDA operating mode, the same cylinder(s) are active/inactive each engine cycle during the fixed cylinder CDA operating mode. A second type of CDA operating mode is known as "skip-fire" operating mode. In skip-fire CDA mode, one or more cylinders are deactivated/inactive (e.g., combustion does not occur) on a cycle-by-cycle basis. Accordingly, a cylinder may be inactive for a first engine cycle and active for a second engine cycle. An "active" cylinder means that combustion is allowed to occur in that cylinder. An "inactive" or "deactivated" cylinder means that combustion is not allowed to occur in that cylinder. The present disclosure is applicable with each type of CDA operating mode, and the term CDA mode or CDA operating mode is meant to encompass all such operating modes unless indicated otherwise.

Condensation occurs when the temperatures within the exhaust systems fall below a condensation dew point temperature threshold, which may also be referred to as a condensation temperature threshold or simply condensation temperature. The condensation temperature corresponds to the temperature at which condensation forms and varies depending on various conditions (e.g., ambient temperature, air density, air pressure, humidity, etc.). At temperatures below the dew point temperature, the air can no longer retain moisture which causes the moisture to be released in the form of condensation. The dew point may be based on a variety of conditions. Condensation may also form when warm air impacts relatively colder objects which cools the air that results in the release of moisture that was retained in the warmer air. Exhaust aftertreatment systems may be exposed to significant condensation during various situations, such as cold-starts or cold ambient operating conditions. The colder temperatures may cause the hotter exhaust gas temperatures to release moisture. For example, extended idle conditions, such as when a vehicle is sitting at a rest stop, can cause condensation to form in the exhaust aftertreatment system and expose one or more catalysts to moisture. This can lead to undesired circumstances, such as the exhaust gas emission above a predefined threshold (e.g., NOx emissions above a predefined limit).

As described herein, a controller receives sensor data and input data and determines whether a condensation state (e.g., state where condensation occurs) is present. For example, the controller may receive data corresponding to ambient and exhaust gas conditions (e.g., temperature, humidity, pressure, etc.) and the controller determines that the exhaust gas temperature is below a condensation temperature, resulting in a condensation state. In some embodiments, based on the controller detecting a condensation state, the controller may operate a cylinder actuation system to activate a predetermined CDA operating mode for the engine. The controller may determine a CDA operating mode that may minimize condensation based on various operating conditions for the system. For example, the controller may determine to implement a skip-fire operating mode rather than a fixed cylinder CDA. Once the CDA operating mode is determined, the controller commands the cylinder actuation system to the determined CDA mode with the engine. Activating the CDA operating mode may increase the exhaust gas temperature exiting the engine, thus raising the temperature within the exhaust system and minimizing condensation by preventing or attempting to prevent temperatures within the exhaust aftertreatment system from falling below the condensation temperature threshold.

As used herein, the phrases "standard" or "normal" as used with respect to describing operation of an engine refers to the engine operating with all cylinders active (e.g., CDA mode is not operating). For example, if an internal combustion engine has six cylinders, all six cylinders are active.

Referring now to FIG. 1, a schematic diagram of a system 100 is shown, according to an exemplary embodiment. The system 100 may be included in a vehicle such as on-road or an off-road vehicle including, but not limited to, line-haul trucks, mid-range trucks (e.g., pick-up trucks), tanks, airplanes, locomotives, various types of industrial equipment (excavators, backhoes, tractors mower, etc.) etc. The system 100 may also be part of a stationary system (e.g., generator, certain factory machinery, etc.).

The system 100 includes an engine 102, which includes a plurality of cylinders 104, a power delivery system 106 coupled to the engine 102, an exhaust aftertreatment system 108 coupled to the engine 102, sensors 110 (e.g., coupled to the engine 102, the exhaust aftertreatment system 108, the power delivery system 106, and/or other components or devices), an input/output device 116, an informational system 114, a cylinder actuation system 118, and a controller 112 coupled to each of the aforementioned components/systems. It should be understood that the system 100 may include additional components/system than those depicted and described herein.

In the example shown, the engine 102 is a compression-ignition engine (e.g., engine operating on the diesel cycle) using fuel configured for compression-ignition engines (e.g., diesel fuel, bio-diesel, etc.). In some other embodiments, the engine 102 is a spark-ignition engine (e.g., engine employing a spark plug to produce ignition) using fuel configured for spark-ignition engines (e.g., gasoline, etc.). In various alternate embodiments, the engine 102 may have other structures or be a part of other engine systems. For example, the engine 102 may be a hybrid engine, which may include both an electric motor or motor(s) and an internal combustion engine that functions to provide power to propel the vehicle. As an example, a hybrid vehicle can have various configurations. For example, in a parallel configuration, both the electric motor and the internal combustion engine are operably connected to the power delivery system 106 and the internal combustion engine indirectly powers the power delivery system 106 by powering the electric motor (examples include extended range electric vehicle or range-extended electric vehicles). In the example depicted, the engine 102 is a compression-ignition powered by diesel fuel.

The engine 102 includes a plurality of cylinders 104. The size/displacement of the engine 102 may vary based on application (e.g., 1 L to 120 L, etc.). The orientations of the cylinders 104 may vary based on structure of the engine 102 as well (e.g., V6-style engine, V8, inline, etc.). Further, there may be any number of cylinders 104 arranged in an engine orientation (e.g., in a V-shape, in a W-shape, inline, etc.). For example, there may be six cylinder 104 oriented in a V-configuration (e.g., two rows of three cylinders 104). In some embodiments, such as when the engine 102 is a spark-ignition engine, the engine 102 may include a spark plug. The spark plug may be a device capable for igniting the contents of the combustion chamber (e.g., electric current spark ignition plug, flame igniters, etc.). During CDA mode, the spark plug may be deactivated in the cylinders 104 that are deactivated.

The system 100 includes a power delivery system 106. The power delivery system 106 is coupled to the engine 102. The power delivery system 106 receives the energy released by the combustion (in the form of a rotating crankshaft) and converts the rotating crankshaft into energy suitable for the function of the system 100. The power delivery system 106 provides power to an end component/system (e.g., power the wheels, another motive device, such as tracks, or a power receiving device if, for example, embodied in a stationary piece of equipment such as a generator or genset). For example, when the system 100 is included in a vehicle, the power delivery system 106 is a drivetrain that may include a transmission, a final drive (e.g., wheels), and any other components of a drivetrain. The power delivery system 106 converts the rotating crankshaft energy into mechanical energy in the form of a rotating driveshaft. The transmission and drivetrain are highly configurable components that may vary based on the application. The power delivery system 106 may include sensors 110 (virtual or real) that provide information or data regarding operation of the power delivery system 106. For example, the sensors 110 may provide the rotational speed of the wheels.

The system 100 includes an exhaust aftertreatment system 108 coupled to the engine 102. The exhaust aftertreatment system 108 is structured to treat exhaust gases from the engine 102 in order to reduce the emissions of harmful or potentially harmful elements (e.g., NOx emissions, CO emissions, particulate matter (PM) emissions, etc.). The exhaust aftertreatment system 108 may include various components and systems, such as a particulate filter 107 (shown as a diesel particulate filter or DPF) and a catalytic system 109. The particulate filter 107 may be structured to remove particulate matter, such as soot, from exhaust gas flowing in an exhaust gas conduit system. The catalytic system 109 may convert pollutants in exhaust gas into less-toxic gases.

The catalytic system 109 may include a selective catalytic reduction (SCR) system 111. A SCR system 111 is configured to convert nitrogen oxides present in the exhaust gases produced by the engine 102 into diatomic nitrogen and water through oxidation within a SCR catalyst 115. The SCR catalyst 115 operation can be affected by several factors. For example, the effectiveness of the SCR catalyst 115 to reduce the NOx in the exhaust gas can be affected by the operating temperature. If the temperature of the SCR catalyst 115 is below a threshold value or range, the effectiveness of the SCR catalyst 115 in reducing NOx may be reduced below a desired threshold level, thereby increasing the risk of high NOx emissions into the environment. The SCR catalyst 115 temperature can be below the condensation temperature under several conditions, such as, for example, during and immediately after engine startup, during cold environmental conditions, etc. Further, typically, higher combustion temperatures promote engine out NOx (EONOx) production. This is due to the rapid fire expansion from within the cylinder 104, which leads to the release of NOx. Increasing EGR leads to reduction in combustion temperatures, which reduces EONOx. However, EGR can promote particulate matter emissions due to incomplete combustion of particles. Additionally, higher loads and power demands also tend to increase combustion temperatures and, in turn, EONOx. Higher power output coincides with higher fueling pressures and quantity (increases in fuel rail pressure). In turn, increasing fueling pressures, quantity, etc. also tends to promote EONOx production. The performance of the SCR catalyst 115 operation can be affected by moisture. Repeated exposure to condensation can degrade performance of the SCR catalyst 115, resulting in an increase of pollutants.

The catalytic system 109 may further include an oxidation catalyst, shown as a diesel oxidation catalyst (DOC) 113, fluidly coupled to the exhaust gas conduit system to oxidize hydrocarbons and carbon monoxide in the exhaust gas. In order to properly assist in this reduction, the DOC 113 may be required to be at a certain operating temperature. In some embodiments, this certain operating temperature is between approximately 200 degrees C. and 500 degrees C. In other embodiments, the certain operating temperature is the temperature at which conversion efficiency of the DOC 113 exceed a predefined threshold value. The performance of the DOC 113 can be affected by moisture. Repeated exposure to condensation can degrade performance of the DOC 113, resulting in an increase of pollutants.

The exhaust aftertreatment system 108 may further include a reductant delivery system (not shown) which may utilize a decomposition chamber (e.g., decomposition reactor, reactor pipe, decomposition tube, reactor tube, etc.) to convert the reductant (e.g., urea, diesel exhaust fluid (DEF), Adblue®, a urea water solution (UWS), an aqueous urea solution, etc.) into ammonia. Reductant is added to the exhaust gas stream to aid in the catalytic reduction. The reductant may be injected by an injector upstream of the SCR system 111 such that the SCR system 111 receives a mixture of the reductant and exhaust flow. The reductant droplets undergo the processes of evaporation, thermolysis, and hydrolysis to form non-NOx emissions (e.g., gaseous ammonia, etc.) within the decomposition chamber, the SCR catalyst 115, and/or the exhaust gas conduit system, which leave the exhaust aftertreatment system 108.

The exhaust aftertreatment system 108 may further include a Lean NOx Trap (LNT) and/or a three-way catalyst (TWC) (or another catalytic converter). The LNT may act to reduce NOx emissions from a lean burn internal combustion engine by means of adsorption. Among other potential functions and features, the TWC may function to manage emissions from rich-burn engines while providing optimal performance with minimal cleaning or maintenance. Utilizing a flow-through substrate coated with a precious metal catalyst, the chemical oxidation process may convert engine out emissions into relatively harmless nitrogen, carbon dioxide and water vapor as the gas passes through the catalytic converter (e.g., three-way catalyst).

The exhaust aftertreatment system 108 may include one or more sensors (virtual or real) that provide information or data regarding operation of the exhaust aftertreatment system 108. The sensors 110 may monitor the characteristics (e.g., contents, temperature, pressure, etc.) of the exhaust gas into, within, and/or out of the exhaust aftertreatment system 108. The sensors 110 may monitor components the characteristics of various components (e.g., catalytic converter, DOC, etc.) of the exhaust aftertreatment system 108. For example, the exhaust aftertreatment system 108 may include a sensor 110 configured to detect moisture within the exhaust aftertreatment system 108.

It should be understood that in other embodiments, more, less, or different components/systems/or devices may be included the exhaust aftertreatment system 108. Thus, this depiction is meant to be exemplary only with the other configurations intended to fall within the scope of the present disclosure. Further, the spatial arrangement of the components may differ than what is depicted.

In some embodiments, the system 100 may further include a heater and/or a hydrocarbon dosing system. The heater may be disposed in the exhaust aftertreatment system 108. The dosing system may be disposed downstream of the engine and, in particular, within the exhaust aftertreatment system 108. The heater and hydrocarbon dosing system are each configured to increase the temperature of at least one component of the exhaust aftertreatment system 108 and/or of the exhaust gas flowing through the exhaust aftertreatment system 108. The heater and the hydrocarbon dosing system may be activated in tandem with the CDA operating mode to increase the temperature of at least one component of the exhaust aftertreatment system 108 and/or of the exhaust gas flowing through the exhaust aftertreatment system 108. Thus, various thermal management strategies may be employed with the CDA operating mode to further help reduce or mitigate condensation.

One thermal management strategy may include an in-cylinder post-injection event. By injecting fuel into one or more of the cylinders after combustion, the post-injected fuel tends to vaporize rather than combust in the cylinders. The non-combusted post-injected fuel does, however, react with one or more catalysts (e.g., the SCR catalyst) in the aftertreatment system to produce heat (e.g., an exothermic reaction), which raises the temperature of the exhaust gas in the SCR system. Post-injection can be near or far post injection.

Another thermal management strategy may be an external cylinder dosing event (i.e., occurring outside of the cylinder). For example, a hydrocarbon dosing system may be located in the exhaust aftertreatment system 108 (e.g., upstream of the DPF) that is structured to inject an amount of HC fuel (e.g., diesel fuel) into the exhaust gas stream. This injection is also referred to as an external post-cylinder HC fuel injection event. When the fuel is injected into the exhaust, the fuel combusts and raises the temperature of the exhaust, which later passes through the catalyst and raises the temperature of the catalyst (e.g., SCR catalyst).

The heater may be any sort of external heat source that can be structured or configured to increase the temperature of passing exhaust gas and/or a component of the exhaust aftertreatment system 108. As such, the heater may be an electric heater, an induction heater, a microwave, or a fuel-burning (e.g., HC fuel) heater. The heater may be powered from a battery of a vehicle housing the system 100. The heater may be of a convection type, where heat is transferred to flowing exhaust gas, or of a conduction type where the heater heats a component which transfers heat to the flowing exhaust gas. Thus, multiple thermal management strategies/techniques may be employed with the CDA operating mode.

As described herein, the controller 112 may monitor operation of the system 100 via one or more sensors 110. The sensors 110 are structured to detect operational characteristics (e.g., temperature, pressure, contents, etc.) of certain components of FIG. 1, such as the engine 102, the cylinders 104, the power delivery system 106, the exhaust aftertreatment system 108, and so on. The number, placement, and type of sensors included in the system 100 is highly configurable. The sensors 110 may include, but are not limited to, one or more of a moisture sensor, pressure sensor, temperature sensor (e.g., fluid temperature sensor, solid surface temperature sensors, IR sensor, etc.), a fluid sensor (e.g., exhaust gas flow rate, coolant flow rate, etc.), torque sensor, speed sensor (e.g., to determine at least one of an engine speed or a vehicle speed), and so on.

Certain sensors 110 may be located proximate to the cylinder 104. In some embodiments, the sensors 110 may be included in the exhaust channels, conduits, pipes, etc. leading away from the cylinder 104. Accordingly, one or more sensors 110 may be structured to detect or otherwise acquire information regarding the exhaust gas emitted from the engine (e.g., exhaust gas constituent information, exhaust gas flow rate, exhaust gas temperature at various locations, and so on). For example, a humidity/moisture sensor may be disposed in the exhaust channels leading away from the cylinders 104 and may detect the concentration of water vapor in the exhaust flow. As another example, a mass flow sensor may be disposed in the exhaust channels leading away from the cylinders 104 and structured to determine a flow rate of exhaust gas away from the cylinders 104. As another example, the sensors 110 may include a temperature sensor structured to determine the temperature of the exhaust flow exiting the cylinders 104. A pressure sensor may be disposed proximate to one or more fuel injectors and structured to acquire information regarding a fuel pressure (or, with systems with a common rail, a pressure of the common rail). In some embodiments, one or more sensors may be positioned within the cylinders 104 or within the intake channel of the cylinder 104. In some embodiments, the cylinder 104 may include a plurality of sensors 110 each structured to detect different characteristics (e.g., fluid information regarding flow entering, leaving, and/or inside the cylinders 104). In some embodiments, each individual sensor 110 is structured to detect multiple types of flow characteristics.

As indicated above, the sensors 110 may be further located within or proximate to the exhaust aftertreatment system 108. In some embodiments, the sensors 110 may be located within or proximate to components of the exhaust aftertreatment system 108, such as the catalytic system and/or the particulate filter. In some embodiments, the sensors 110 are located directly in fluid conduits (e.g., pipes, etc.) between the components of the exhaust aftertreatment system 108. The one or more sensors 110 may be structured to detect or otherwise acquire information regarding the components of the exhaust aftertreatment system 108 and/or the exhaust gases flowing through the exhaust aftertreatment system 108. For example, a condensation sensor may determine whether condensation is present within the exhaust aftertreatment system 108 (e.g., in or proximate to a SCR system). As another example, a mass flow sensor may be disposed upstream of the SCR system and structured to determine a flow rate of exhaust gas entering the SCR system. Based on the flow rate over a predefined unit of time, the controller 112 may determine an amount of exhaust gases entering the catalytic system for a period of time (via an integration process using the flow rate over a predefined amount of time). In some embodiments, one or more sensors may be located outside of, but proximate to, the exhaust aftertreatment system 108. For example, a temperature sensor may detect the ambient temperature nearby, but not within, the exhaust aftertreatment system 108.

The sensors 110 may also include sensors to detect information regarding the effectiveness of the exhaust aftertreatment system 108. The sensors may be NOx sensors, temperature sensors, particulate matter (PM) sensors, and/or other emissions-related sensors. The sensors 110 may be located before and after the exhaust aftertreatment system 108 and/or between the individual components of the exhaust aftertreatment system 108. The sensors 110 are structured to acquire data indicative of emissions at each location that the sensors 110 are located (e.g., concentration amount, such as parts per million). Effectiveness of the exhaust aftertreatment system 108 may refer to a NOx conversion efficiency (e.g., fraction of NOx converted to Nitrogen and water), a measure of PM emissions relative to a threshold, a measure of greenhouse gas emissions (e.g., carbon dioxide, methane, nitrous oxide, etc.) relative to a threshold, and the like.

Additional sensors 110 may be also included with the system 100. The sensors 110 may include engine-related sensors (e.g., torque sensors, speed sensors, pressure sensors, etc.). The sensors 110 may further include sensors 110 associated with other components of the vehicle (e.g., speed sensor of a turbo charger, fuel quantity and injection rate sensor, fuel rail pressure sensor, etc.).

The exhaust gas and exhaust aftertreatment system 108 characteristics may be determined by the controller 112 after receiving signals, information, data, etc. from the at least one sensor 110. The controller 112 may compare the sensor 110 signals to a lookup table, use the information in one or more algorithms or processes, use the information in one or more models, etc. stored in a memory of the controller 112, and so on to determine condensation data/information. For example, sensors 110 may detect a temperature and flow rate of the exhaust gas, and in response, the controller 112 may then compare the temperature and flow rate of the exhaust gas and determine the corresponding heat transfer from the exhaust gas onto a component of the exhaust aftertreatment system 108. The controller 112 may in turn determine whether condensation is present in the catalytic system 109 of the exhaust aftertreatment system 108. As another example, the controller 112 may receive signals from one or more sensors 110 that detect ambient temperature, internal temperatures, flow rate, etc. and then use an algorithm to calculate or determine whether condensation is forming, likely to form, and/or has formed in the catalytic system 109 or other parts of the exhaust aftertreatment system 108.

The controller 112 is further configured to monitor the system 100 from information, signals, data, etc. received from the informational system 114. The informational system 114 is a computing system associated with a provider computing system. The provider may provide one or more system components, such as an engine. In the example shown, the provider is an engine manufacturer. The informational system 114 may communicate with the system 100 via a network (e.g., Internet, Wi-Fi, etc.). The informational system 114 is structured to detect and transmit various information corresponding to the system 100 and the system in which the system 100 may be included. The informational system 114 may include a variety of information gathering components such as a GPS transponder, timer, etc. The information the informational system 114 may detect, acquire, receive, and/or otherwise obtain can include a GPS position of the system 100, a run-time (e.g., time of operation) of the system 100 (e.g., hours system 100 has been active) over a period of time (e.g., day, week, etc.), etc. The controller 112 may use the information received from the informational system 114 to determine present or predicted future operating conditions of the system 100. For example, the controller 112 may determine a different operating conditions depending on the run-time of the engine being close to a preset daily limit (or other limit). More specifically, the controller 112 may track the run-time of an engine over a period of time to determine if the run-time is below, at, or above a regulated threshold (e.g., a predefined acceptable operational time threshold). The run-time of the engine may be measured as total run-time of the engine (e.g., including idling, parking, etc.), or may include operational time, which may only include time when the system 100 is in "drive", time in motion, or the like. In some embodiments, the informational system 114 may determine an engine off-time corresponding to the time the engine has been off. The regulated threshold may be a limit designated by a company (e.g., owner of the system 100), municipality, government agency, or the like and stored by and/or received by the controller 112 from the informational system 114. In some embodiments, the regulated limit is determined by the controller 112 based on the GPS position of the system 100 from the informational system 114. For example, the regulated limit may be determined based on the system 100 entering a state (e.g., area with a uniform rule of law) and receiving or determining, based on using a look-up table, the regulated limit as per the state legal system. In some embodiments, the controller 112 may determine a predetermined operation time threshold, which is lower than the regulated threshold. The predetermined operation time threshold may be an amount of time (e.g., 5 minutes, 10 minutes, 30 minutes, 60 minutes, etc.) less than the regulated threshold.

In some embodiment, the controller 112 determines a different operating condition based on the system 100 being located at a specific idle location (i.e., a location associated with engine idle operation), such as a truck stop, parking lot, loading dock, hotel, rest area, gas station, or the like. The controller 112 receives the GPS position of the system 100 from the informational system 114 (or determines a location of the system 100 itself without communicating with the informational system 114, such that the controller 112 may include an on-board GPS) and determines whether the system 100 is likely to experience idling conditions. For example, if the system 100 is stationary and has been stationary for a predefined amount of time, the controller 112 determines that the system 100 is experiencing an engine idle condition. As another example, if the controller 112 determines that the system 100 is at or within a predefined distance of an engine idle location and that the operation time of the system is within a predefined amount of the predefined limit, the controller 112 may determine that the engine is about to experience an extended idle. In particular, if the system 100 is stationary, the controller 112 compares the GPS position of the system 100 to a map, look-up table, or the like to determine if system 100 is at a predefined location associated with idling conditions. In some embodiments, the informational system 114 may send a signal to the controller 112 when the system 100 enters a specific location. In one embodiment and once the controller 112 determines the system 100 is stationary at a specific location, the controller 112 may determine a different engine operating condition. In some embodiments, the engine operating condition determined by the controller 112 depends on the specific location. For example, the engine operating condition may be different for a truck stop than it is for a gas station, as the system 100 is more likely to remain at a truck stop longer than at a gas station (i.e., extended idle versus temporary idle). In some embodiments, the specific locations may be predetermined points along the route and the controller 112 may determine the distance from the specific locations.

An input/output device 116 is also included in the system 100. The input/output device 116 is coupled to the controller 112, and in turn, may exchange signals, information, etc. with the controller 112. For example, the input/output device 116 may provide an indication regarding a change in power requested from the system 100. The input/output device 116 may include a vehicle control device, such as an accelerator pedal, a transmission shifter, a brake pedal, transmission paddle shifter, etc. The input/output device 116 may include a steering wheel, a joystick, a brake pedal, an accelerator pedal, etc. For example, when the accelerator pedal is pressed, the controller 112 may interpret this position as a request for an increase in power. The controller 112 may use the information received from the input/output device 116 to determine or adjust the operation conditions of the system 100. The input/output device 116 may further include output and indication devices such as display devices (e.g., LCD display, LED display, screen etc.), visual indicator (e.g., indicator light, switch, etc.), audio indicators (e.g., speaker, etc.), or the like. For example, the input/output device 116 may include an LED light that flashes to indicate that the engine is operating in a CDA mode. Thus, the input/output device 116 may be one or more display devices included with the vehicle that houses the system 100.

A cylinder actuation system 118 is included in the system 100. The cylinder actuation system 118 is coupled to the controller and to a camshaft of the engine 102. The cylinder actuation system 118 is configured to rotate the camshaft responsive to signals, commands, etc. from the controller 112. The cylinder actuation system 118 may be coupled directly to valves of the engine 102, such that the valves may be operated (opened or closed) without the camshaft. In some embodiments, the cylinder actuation system 118, based on one or more commands or instructions from the controller 112, may operate the intake valves and/or exhaust valves of at least one cylinder 104 outside of a typical operating pattern (e.g., the intake valve is open during the exhaust stroke of the cylinder 104).

Also as shown, the system 100 includes a controller 112. The controller 112 is structured to control, at least partly, operation of the cylinder actuation system 118, the sensors 110, the informational system 114, and the input/output device 116. Communication between and among the components may be via any number of wired and/or wireless connections. For example, a wired connection may include a serial cable, a fiber optic cable, a CAT5/5e/6 cable, or any other form of wired connection. A wireless connection may include the Internet, Wi-Fi, cellular, radio, etc. In one embodiment, a controller area network ("CAN") bus provides the exchange of signals, information, and/or data. The CAN bus includes any number of wired and wireless connections that provide the exchange of signals, information, and/or data. The CAN bus may include a local area network (LAN), or a wide area network (WAN), or the connection may be made to an external computer (for example, through the Internet using an Internet Service Provider).

Thus, the controller 112 may receive and use various data, wherein the data may include GPS location of the system 100, operating conditions (e.g., temperature within components of the system 100, ambient temperature, flow rate, temperature of exhaust gas, contents of exhaust gas, etc.), environmental information (e.g., weather data such as ambient temperature, ambient pressure, a current dew-point, wind conditions, precipitation conditions, etc.), system 100 run-time and so on where the data may be received via one or more sensors 110 and/or determined by the controller 112 based on information received from the sensors, and so on. The structure and function of the controller 112 are further described in regard to FIG. 2.

Figure 2:
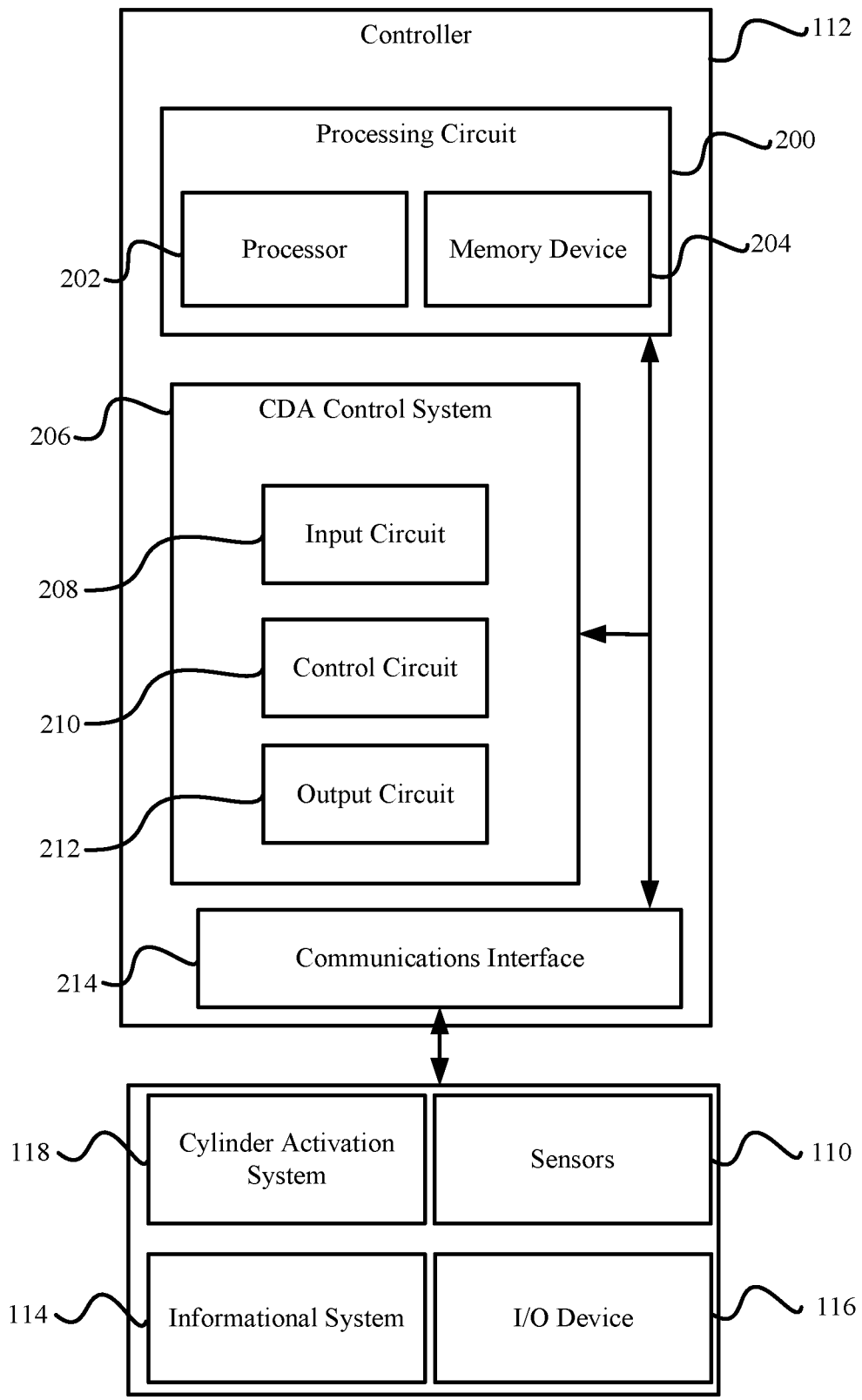
FIG. 2 is a schematic diagram of the controller of FIG. 1, according to an exemplary embodiment.

Referring now to FIG. 2, a schematic diagram of the controller, such as controller 112, of FIG. 1 is shown, according to an exemplary embodiment. The controller 112 is structured to receive inputs (e.g., signals, information, etc.) from one or more components of the system 100, such as the sensors 110, the input/output device 116, and the informational system 114. The controller 112 is structured to control, at least partly, the cylinder actuation system 118 and the engine 102. As the components of FIG. 2 can be embodied in a vehicle, the controller 112 may be structured as one or more electronic control units (ECU). The controller 112 may be separate from or included with at least one of the transmission control unit, an exhaust aftertreatment control unit, a powertrain control module, an engine control module, etc.

In operation, the controller 112 is configured to determine whether a condensation state (e.g., a state where it is likely that condensation will form or has formed) is present within the exhaust aftertreatment system 108 or within individual components of the exhaust aftertreatment system 108. Responsive to determining a condensation state is preset, the controller 112 is configured to command the cylinder actuation system 118 to operate the engine 102 in a CDA operating mode. Operating the engine 102 in a CDA mode increases the temperature of the exhaust gas exiting the engine 102 and entering the exhaust aftertreatment system 108. Increasing the exhaust gas temperature raises the temperature of the exhaust aftertreatment system 108, or components thereof, to be at or above condensation temperatures for the system in order to reduce, decrease, or otherwise mitigate the likelihood that condensation will form in the exhaust aftertreatment system 108. The controller 112 may receive and analyze data from the sensors 110 and the informational system 114 to determine whether the condensation state is present. The controller 112 may also determine the type of CDA mode to increase the exhaust gas temperature to a temperature where the exhaust aftertreatment system 108 is no longer in a condensation state.

The controller 112 is shown to include a processing circuit 200 having a processor 202 and a memory device 204, a CDA control system 206 having an input circuit 208, a control circuit 210, and an output circuit 212, and a communications interface 214.

The communications interface 214 is structured to enable the controller 112 to communicate with the system 100 components such as the cylinder actuation system 118, the sensors 110, the informational system 114, and the input/output device 116. The communications interface 214 may include any combination of wired and/or wireless interfaces (e.g., jacks, antennas, transmitters, receivers, transceivers, wire terminals, etc.) for conducting data communications with these various systems, devices, or networks to enable in-vehicle communications (e.g., between and among the components of the vehicle) and, in some embodiments, out-of-vehicle communications (e.g., with a remote server). For example and regarding out-of-vehicle/system communications, the communications interface 214 may include an Ethernet card and port for sending and receiving data via an Ethernet-based communications network and/or a Wi-Fi transceiver for communicating via a wireless communications network. In some embodiments, a telematics device may be included with the vehicle that enables out-of-vehicle communications. The communications interface 214 may be structured to communicate via local area networks or wide area networks (e.g., the Internet) and may use a variety of communications protocols (e.g., IP, LON, Bluetooth, ZigBee, radio, cellular, near field communication).

In one configuration, the input circuit 208, the control circuit 210, and the output circuit 212 are embodied as instructions that are executable by a processor, such as processor 202 and stored in a memory device, such as memory device 204. As described herein and amongst other uses, the instructions facilitate performance of certain operations to enable reception and transmission of data. For example, the instructions may provide an instruction (e.g., command, etc.) to, e.g., acquire data. In this regard, the instructions may be or include programmable logic that defines the frequency of acquisition of the data (or, transmission of the data). The instructions may include code, which may be written in any programming language including, but not limited to, Java or the like and any conventional procedural programming language, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the input circuit 208, the control circuit 210, and the output circuit 212 are embodied as hardware units, such as electronic control units. As such, the input circuit 208, the control circuit 210, and the output circuit 212 may be embodied as one or more circuitry components including, but not limited to, processing circuitry, network interfaces, peripheral devices, input/output devices, output device, sensors, etc. In some embodiments, the input circuit 208, the control circuit 210, and the output circuit 212 may take the form of one or more analog circuit, electronic circuit (e.g., integrated circuits (IC), discrete circuits, system on a chip (SOCs) circuits, microcontrollers, etc.), telecommunication circuits, hybrid circuits, and any other type of "circuit." In this regard, the input circuit 208, the control circuit 210, and the output circuit 212 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on. The input circuit 208, the control circuit 210, and the output circuit 212 may also include programmable hardware devices such as field programmable gate arrays, programmable array logic, programmable logic devices or the like. The input circuit 208, the control circuit 210, and the output circuit 212 may include one or more memory device for storing instructions that are executable by the processor(s) of the input circuit 208, the control circuit 210, and the output circuit 212. The one or more memory device and processor(s) may have the same definition as provided below with respect to memory device 204 and processor 202. In some hardware unit configurations, the input circuit 208, the control circuit 210, and the output circuit 212 may be geographically dispersed throughout separate locations in, for example, a vehicle. Alternatively and as shown, the input circuit 208, the control circuit 210, and the output circuit 212 may be embodied in or within a single unit/housing, which is shown as the controller 112.

In the example shown, the controller 112 includes the processing circuit 200 having the processor 202 and the memory device 204. The processing circuit 200 may be structured or configured to execute or implement the instructions, commands, and/or control processes described herein with respect to the input circuit 208, the control circuit 210, and the output circuit 212. The depicted configuration represents the input circuit 208, the control circuit 210, and the output circuit 212 as instructions that may be stored by the memory device. However, as mentioned above, this illustration is not meant to be limiting as the present disclosure contemplates other embodiments where the input circuit 208, the control circuit 210, and the output circuit 212, or at least one circuit of the input circuit 208, the control circuit 210, and the output circuit 212, is configured as a hardware unit. All such combinations and variations are intended to fall within the scope of the present disclosure.

The processor 202 may be a single- or multi-chip processor, a digital signal processor (DSP), an application specific integrated circuit (ASIC), a field programmable gate array (FPGA) or other programmable logic device, discrete gate or transistor logic, discrete hardware components, or any combination thereof, and the like. In this regard, a processor may be a microprocessor, or, any conventional processor, or state machine. A processor also may be implemented as a combination of computer devices, such as a combination of a DSP and a microprocessor, a plurality of microprocessors, one or more microprocessors in conjunction with a DSP core, or any other such configuration. In some embodiments, the processor 202 may be shared by multiple circuits (e.g., the input circuit 208, the control circuit 210, and the output circuit 212 may comprise or otherwise share the same processor that, in some example embodiments, may execute instructions stored, or otherwise accessed, via different areas of memory). Alternatively or additionally, the one or more processors may be structure to perform or otherwise execute certain operations independent of one or more coprocessors. In other example embodiments, two or more processors may be coupled via a bus to enable independent, parallel, pipelined, or multi-threaded instruction execution. All such variations are intended to fall within the scope of the present disclosure.

The memory device 204 (e.g., memory, memory unit, storage device) may include one or more devices (e.g., RAM, ROM, Flash memory, hard disk storage) for storing data and/or computer code or instructions for completing or facilitating the various processes, layers and modules described in the present disclosure. The memory device 204 may be coupled to the processor 202 to provide computer code or instructions to the processor 202 for executing at least some of the processes described herein. Moreover, the memory device 204 may be or include tangible, non-transient volatile memory or non-volatile memory. Accordingly, the memory device 204 may include database components, object code components, script components, or any other type of information structure for supporting the various activities and information structures described herein.

The CDA control system 206 is structured to receive information from the sensors 110, from an operation, and/or the informational system 114 through the input circuit 208. In particular, the input circuit 208 is structured to receive information from the sensors 110 and the informational system 114 via the communications interface 214. The input circuit 208 may also receive data (e.g., power request commands) from the input/output device 116 (e.g., depression of the accelerator pedal, release of the accelerator pedal, indications of transmission shift events, explicit operator commands, etc.). The input circuit 208 may modify or format the received information (e.g., via an analog/digital converter, etc.) so that the information can be readily used by the control circuit 210 or another circuit (e.g., the output circuit 212).

Based on the received information, the control circuit 210 of the CDA control system 206 is structured to monitor the system 100 and determine one or more control operating parameters for the cylinder actuation system 118, engine 102, and various other components or systems. The output circuit is structured to send the control operating parameters to the cylinder actuation system 118. The output circuit 212 may modify or format the information prior to sending (e.g., via an analog/digital converter, etc.) so that information can be readily used by the cylinder actuation system 118 and/or other systems, components, etc.

The CDA control system 206 is structured to implement a CDA operating mode with the engine. The CDA control system 206 is configured to control activation and deactivation of the cylinders 104 of the engine 102. The CDA control system 206 is also structured to implement various CDA operating modes, such as a dynamic skip-fire operating mode, a fixed cylinder operating mode, etc. The CDA control system 206 may also determine the power provided by the active cylinders 104 to the power delivery system 106 during the CDA operating mode. For example, a sensor 110 may monitor the power output and send the power output data to the controller 112. As another example, the CDA control system 206 may correlate fueling commands (e.g., quantity, timing, etc.) to an approximate power output demanded for the engine (i.e., the active cylinders). Based on received information, the CDA control system 206 may determine a maximum or approximate maximum power output that the number of activated cylinders 104 can produce without activation of additional cylinders. The maximum power output may be a predefined value that is specific to the number of active cylinders and potentially other factors. For example, the CDA control system 206 may determine that four of six cylinders 104 are active in an engine 102 and, as such, the CDA control system 206 may then determine that the engine 102 may produce maximum power corresponding to four active cylinders. In another embodiment, the CDA control system 206 may determine a maximum power output for the number of active cylinders by the control circuit 210 accessing a lookup-table, using an algorithm, a model, etc. The operating mode as well as any associated information (e.g., power output, maximum power output, etc.) may be stored and accessed in the memory device 204.

The CDA control system 206 is structured to receive operating characteristic data (e.g., temperature, humidity, etc.) of the system 100 and system 100 components. The CDA control system 206 can determine whether a condensation state is present in the exhaust aftertreatment system 108 based on the operating characteristic/information data. The CDA control system 206 may also determine a condensation temperature. The condensation temperature corresponds to the temperature at or below which condensation starts to form. The condensation temperature may be determined in reference to an exhaust gas temperature and/or an exhaust system temperature, or another temperature within system 100. In some embodiments, a remote computing system (i.e., the informational system 114), located externally from the system 100, determines the condensation temperature and sends the condensation temperature to the controller 112. The condensation temperature may be calculated by the CDA control system 206 using a formula with a variety of environmental information (e.g., ambient temperature, etc.) as well as operating information (e.g., existing exhaust gas temperature or system temperatures, fuel type, air-fuel ratio, engine coolant temperature, fuel injection quantity, engine timing, engine run time, engine off time, engine coolant temperature, etc.) as inputs.

In some embodiments, the CDA control system 206 may determine whether a condensation state is present based on only the environmental information. For example, the CDA control system 206 may determine whether a condensation state is present based on determining the engine is running in ambient temperatures that are below an ambient temperature threshold. In this instance, a warm engine (i.e., an engine temperature at or above a threshold temperature) may promote condensation when the ambient temperatures are at or below a cold temperature threshold. In some embodiments, the CDA control system 206 may determine whether a condensation state is present based on only the operating conditions. For example, the CDA control system 206 may determine whether a condensation state is present based on at least one of a determined or measured temperature associated with the exhaust system (e.g., exhaust gas temperature, catalyst bed temperature, conduit (pipe) temperature, etc.), engine coolant temperature, engine run-time since engine start, engine off-time, cumulative amount of fuel burned since engine start, and/or the like. In some embodiments and as alluded to above, the CDA control system 206 may determine whether a condensation state is present based on various combinations of environmental information and operation information (e.g., engine coolant temperature and environmental information, environmental information and a temperature associated with the exhaust aftertreatment system 108, engine run time in combination with environmental information, engine off time in combination with environmental information, a cumulative amount of fuel burned in combination with environmental information). These combinations may be stored by the controller to determine a presence of a condensation state based on various combinations.

The CDA control system 206 can use the condensation state information and/or the condensation temperature when determining the CDA operating mode conditions. For example, when a condensation state is determined to by present, the CDA control system 206 may command the cylinder actuation system 118 to operate in a CDA operating mode. As another example, if an exhaust gas temperature is determined to be below a condensation temperature, the CDA control system 206 may first determine a CDA operating mode that may increase the exhaust gas temperature to at or above the condensation temperature. The CDA control system 206 may then command the cylinder actuation system 118 to operate the engine 102 in a CDA operating mode.

The CDA control system 206 is structured to receive data from the informational system 114 regarding the system 100. The data received from the informational system 114 may include information corresponding to a GPS position of the system 100, weather data, engine run-time, general time data (e.g., time zone, clock, etc.), and/or other information. The CDA control system 206 may use this data to determine whether the system 100 is idling and/or the likelihood of an extended idle period (e.g., a period where the system 100 may be running in an idle operating mode for more than a predefined amount of time, such as more than three minutes). Extended idle periods may result in a condensation state as engines generally run cooler when in idle. If the CDA control system 206 determines that an extended idle period is likely, the CDA control system 206 may command the cylinder actuation system 118 to activate a CDA operating mode. For example, if the system 100 is on a truck and based on location data regarding the system, the CDA control system 206 may determine that the truck is located at a resting area (e.g., area where the truck may be located for an extended period of time), such as a parking lot, loading dock, hotel, truck stop, interstate rest area, etc. and from such a determination, the CDA control system 206 may determine that an extended idle period is likely. The CDA control system 206 may then command the cylinder actuation system 118 to operate a CDA operating mode. Conversely, if the CDA control system 206 determines that the vehicle is located in traffic on a street or highway, the CDA control system 206 may determine that a CDA operating mode is not needed to minimize condensation formation in the exhaust aftertreatment system 108. In some embodiments, the CDA control system 206 may utilize input data from the input/output device 116 in further determining whether an extended idle period may be likely. For example, if the system 100 is in a vehicle which has its transmission set in "park," the CDA control system 206 may determine that an extended idle period is more likely than when the transmission is set into "drive." In some embodiments, the CDA control system 206 may monitor the engine run-time to determine the likelihood of an extended idle event. For example, if the run-time is nearing a regulated threshold, the CDA control system 206 may determine that an extended idle period is more likely. The CDA control system 206 may include machine learning algorithms that determine patterns within an operator's behavior and use the patterns to determine whether an extended idle period is more likely. For example, if an operator always takes a break after operating the system 100 for a predefined amount of time (e.g., 4 hours), the CDA control system 206 may determine that an extended idle period is more likely at about 4 hours of run-time The CDA control system 206 may further receive information regarding a plurality of areas along a route of the system 100 that have a high likelihood of engine idle operation (e.g., parking lot, loading dock, hotel, truck stop, interstate rest area, etc. The CDA control system 206 then determines that the location of the system 100 is within a predefined amount (e.g., 1 mi, 2 mi, 5 mi, 10 mi, 15 mi, 20 mi, etc.) and that the system 100 is moving towards one of the areas with a high likelihood of engine idle operation. The CDA control system 206 may then monitor the location information of the system 100 and engine state (e.g., whether the engine 102 is in an idle mode) to automatically start the CDA operating mode when the engine 102 is idling in one of the areas.

In some embodiments, when the CDA control system 206 determines that a CDA operating mode would decrease the likelihood of condensation forming, the CDA control system 206 may then operate a predetermined CDA operating mode. For example, the predetermined CDA operating mode includes deactivating two cylinder 104 in a six-cylinder engine, resulting in four active cylinders 104. In some embodiments, when the CDA control system 206 determines that a CDA operating mode would decrease the likelihood of condensation forming, the CDA control system 206 may then determine a CDA firing density (a number of active cylinders) that defines a number (e.g., 1, 2, 3, 4, 5, etc.) of cylinders to deactivate or, alternatively, keep active. For example, the CDA control system 206 may determine that four cylinders 104 should be deactivated to reduce the likelihood of condensation forming, or as another example, the CDA control system 206 may determine that two cylinders 104 should be deactivated to reduce the likelihood of condensation forming. After the CDA control system 206 determines the CDA operating mode and firing density, the CDA control system 206 commands the cylinder actuation system 118 to deactivate the determined number of cylinders 104. The cylinder actuation system 118 then deactivates the determined number of cylinders 104. The CDA operating mode may operate for a predetermined period of time (e.g., 5 s, 10 s, 30 s, 1 min, 5 min, etc.) or the CDA operating mode may operate until the CDA control system 206 determines that the likelihood of condensation forming is below a threshold.

Figure 3:
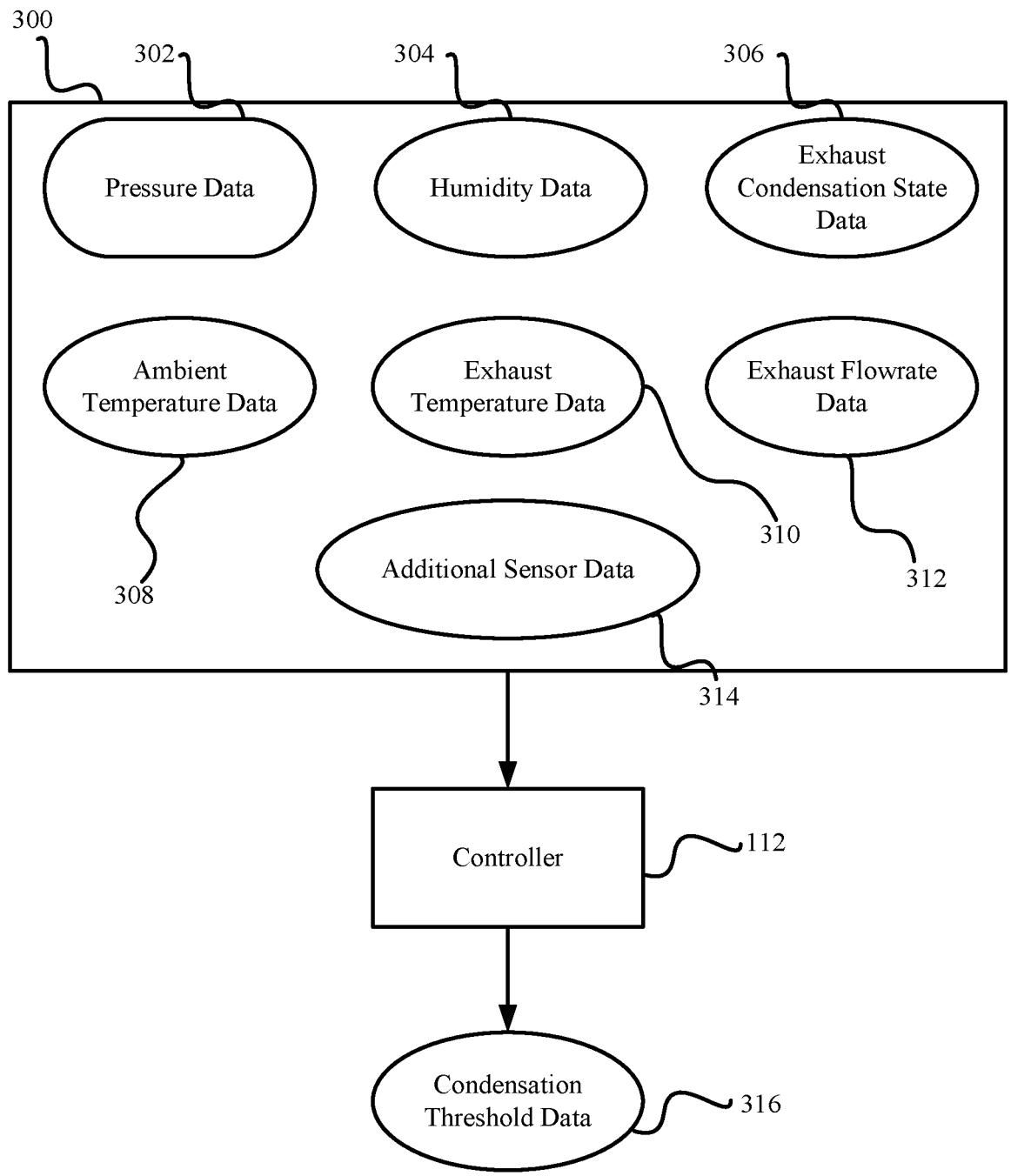
FIG. 3 is a pictorial diagram of certain information received by the controller of FIGS. 1-2 to determine condensation threshold data, according to an exemplary embodiment.

Referring now to FIG. 3, a pictorial diagram of certain information received by the controller of FIGS. 1-2 to determine condensation threshold data is shown, according to an exemplary embodiment. The controller 112 receives a data grouping 300. The data grouping 300 includes input data that the controller 112 may utilize to determine if condensation is present, or if condensation is likely to be present, in an exhaust system. The data grouping 300 may include data such as pressure data 302, humidity data 304, exhaust condensation state data 306, ambient temperature data 308, exhaust temperature data 310, exhaust flowrate data 312, and additional sensor data 314. The pressure data 302 may include sensor 110 measurements of the pressure of the exhaust gas from within the exhaust aftertreatment system 108 or within the engine 102. The humidity data 304 may include sensors 110 measurements of the exhaust gas from within the exhaust aftertreatment system 108 or within the engine 102. The exhaust condensation state data 306 may include sensor 110 measurements of whether condensation is forming from the exhaust gas from within the exhaust aftertreatment system 108 or within the engine 102. For example, a condensation sensor may be located within a catalytic system 109 of the exhaust aftertreatment system 108. In some embodiments, the controller 112 may determine whether a condensation state is present based on a variety of inputs. The ambient temperature data 308 may include sensors 110 measurements of the ambient temperature outside of the engine 102 and the exhaust aftertreatment system 108. In some embodiments, the ambient pressure, wind speed, air speed, and other similar values may be determined and included in the ambient temperature data. The exhaust temperature data 310 may include sensor 110 measurements of the exhaust gas temperature after leaving cylinder 104 within the engine 102 or within the exhaust aftertreatment system 108. For example, one or more sensors 110 may be located and configured to measure exhaust gas temperature at an inlet of the catalytic system 109. The exhaust flowrate data 312 may include sensors 110 measurements of the exhaust gas flow rate within the engine 102 and the exhaust aftertreatment system 108. The data included in the data grouping 300 may all be measured or determined at one location in the engine 102 or the exhaust aftertreatment system 108 (e.g., an inlet of the catalytic system 109, turbine outlet, cylinder exhaust channel, particulate filter 107, fluid conduit, etc.). In some embodiments, the data included in the data grouping 300 may be measured in a variety of locations within the engine 102 and/or the exhaust aftertreatment system 108.

The data grouping 300 is received by the controller 112, and the controller 112 is structured to determine condensation threshold data 316 based on the received data grouping 300. The condensation threshold data 316 corresponds to data that the controller 112 may utilize to determine the likelihood of condensation forming within an exhaust aftertreatment system 108. For example, the controller 112 determining the condensation threshold data 316 may include determining a temperature at or below which condensation may form in the exhaust aftertreatment system 108 or within individual components of the exhaust system. The condensation threshold data 316 may be a temperature, pressure, humidity percentage, or other similar characteristic of either the exhaust gas or components of the engine 102 and/or the exhaust aftertreatment system 108. In some embodiments, the condensation threshold data 316 may include multiple condensation thresholds.

Figure 4:
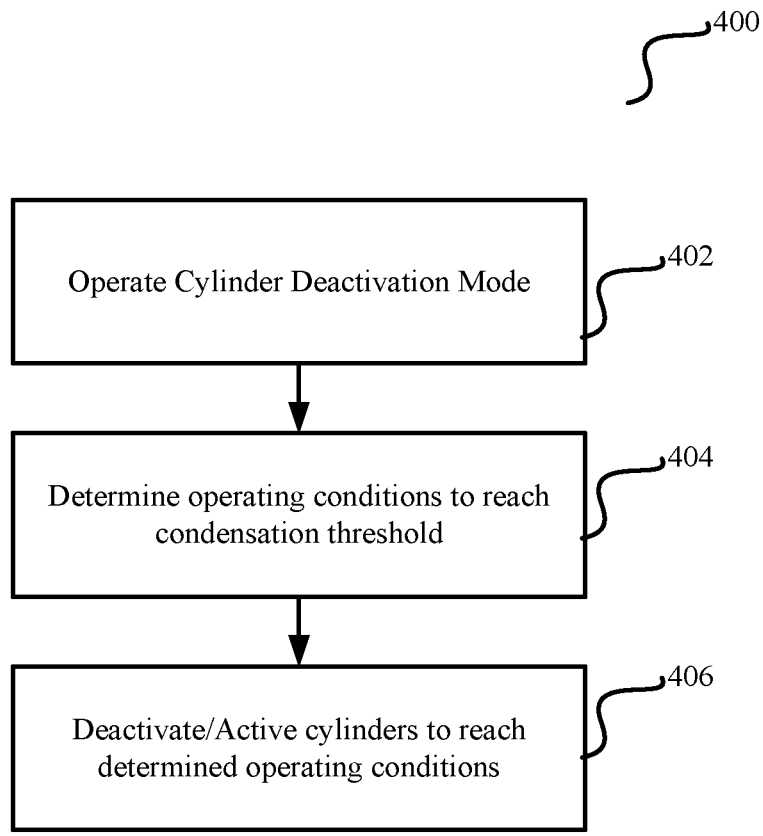
FIG. 4 is a flow diagram of a method of determining operating conditions of an engine, according to an exemplary embodiment.

Referring now to FIG. 4, a flow diagram of a cylinder deactivation method 400 of determining operating conditions of an engine is shown, according to an exemplary embodiment. The controller 112 is structured to command the cylinder actuation system 118 to deactivate/activate cylinder(s) 104 after determining the operating conditions of the engine 102 that meet, substantially meet, or attempt to meet at least one of the condensation temperatures determined by the controller 112. At process 402, the controller 112 commands the cylinder actuation system 118 to operate a CDA operating mode for the engine 102. Commanding the cylinder actuation system 118 may be in response to determining that a condensation state is present in the exhaust aftertreatment system 108. In some embodiments, the controller 112 may command the cylinder actuation system 118 to operate the engine 102 in a CDA operating mode in response to the controller 112 receiving a signal corresponding to a user input, change in ambient conditions, etc. In some embodiments, operating the engine 102 may be preventative (e.g., operated prior to a condensation state being present). For example, the controller 112 may be configured to activate a cylinder deactivation mode in the engine 102 for a period of time (e.g., 5 s, 10 s, 15 s, 30 s, 1 min, 5 min, 10 min, etc.) periodically (e.g., every hour, every 15 minutes, etc.).

At process 404, the controller 112 determines operating conditions for the engine 102 that meet, substantially meet, or attempt to meet at least one of the condensation temperatures of the exhaust gas or components of the exhaust aftertreatment system 108. The operating conditions determined by the controller 112 may be determined based on at least one priority factor. The at least one priority factor may be the operating conditions that reach the condensation temperatures quickest, that are the most fuel efficient, that operate the engine 102 at or below an engine noise threshold, that reduce engine 102 wear, or the like. The controller 112 may determine which type of CDA operating mode (e.g., skip-fire, fixed cylinder, etc.). The controller 112 determines how many cylinders 104 of the engine 102 should be active/de-active (e.g., the firing density) during CDA operating mode to reach the condensation temperatures. Determining the CDA operating mode, including the number of cylinders active/deactivated and the type of CDA operating mode, may include the controller 112 entering a variety of inputs (e.g., sensors 110 measurements, information from the informational system 114, the at least one priority factor, the condensation threshold data, etc.) into an algorithm or a look-up table to determine the operating conditions for the engine 102 that meet, substantially meet, or attempt to meet at least one of the condensation temperatures.

At process 406, the controller 112 commands the cylinder actuation system 118 to operate the engine 102 in the determined operating conditions. In some embodiments, the cylinder actuation system 118 may operate the engine 102 in the determined operating conditions until the cylinder actuation system 118 receives a signal to change the operating condition. In some embodiments, the cylinder actuation system 118 may operate the engine 102 in the determined operating conditions for a predetermined amount of time or until the controller 112 determines a condensation state is no longer present.

Figure 5:
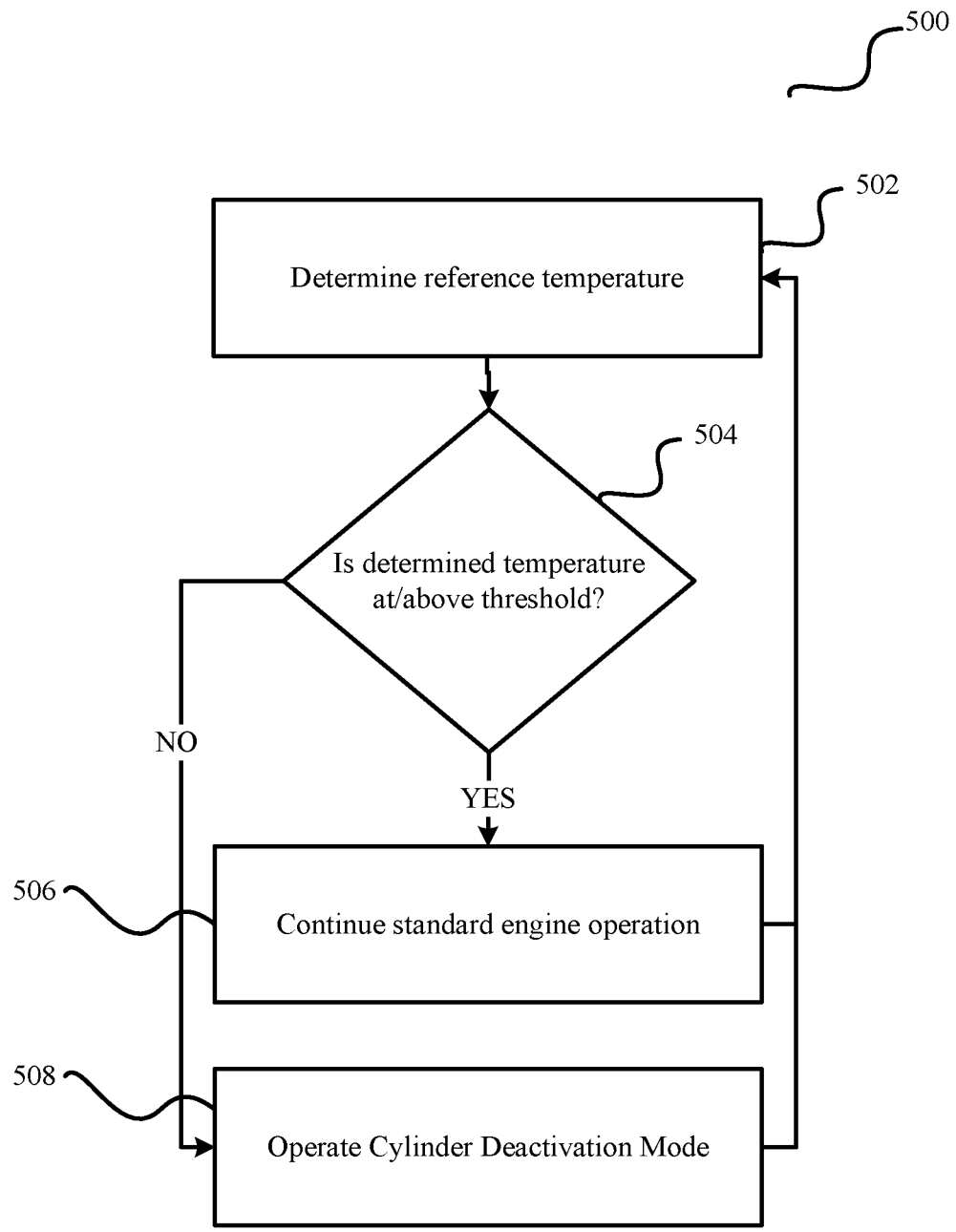
FIG. 5 is a flow diagram of a method for operating a cylinder deactivation operating mode for an engine to minimize condensation in an exhaust system coupled to the engine, according to an exemplary embodiment.

Referring now to FIG. 5, a flow diagram of a temperature response method 500 for operating a cylinder deactivation operating mode for an engine to minimize condensation in an exhaust aftertreatment system 108 of the engine 102 is shown, according to an exemplary embodiment. The temperature response method 500 utilizes a CDA operating mode to increase the exhaust gas and/or aftertreatment system component temperatures.

At process 502, the controller 112 determines a reference temperature. The reference temperature may be an exhaust gas temperature in a location in the exhaust aftertreatment system 108 (e.g., particulate filter outlet, catalytic system inlet, catalytic system outlet, etc.), or the reference temperature may be measured temperature of a component of the exhaust aftertreatment system 108 (e.g., particulate filter 107, fluid conduit, catalyst, etc.). In some embodiments, the reference temperature may include temperatures measured in a plurality of locations in the engine 102 and/or the exhaust aftertreatment system 108.

At process 504, the controller 112 determines if the reference temperature is at or above the condensation temperature. In some embodiments, the condensation temperature may change depending on a variety of inputs (as described in reference to FIG. 3). In some embodiments, the condensation temperature may be predetermined and unchanging. The condensation temperature may correspond to a condensation state. In some embodiments, the controller 112 may determine if the reference temperature is decreasing. In some embodiments, if the controller 112 determines that the reference temperature is decreasing, the controller 112 may extrapolate the reference temperature decrease and determine when the reference temperature will drop below the condensation temperature.

If the controller 112 determines that the reference temperature is at or above the condensation temperature, the controller 112 maintains the standard (non-CDA) engine operation at process 506. Once the engine 102 continues its operation, the controller 112 again determines the reference temperature at 502. The reference temperature measurements may be taken continuously, or periodically (e.g., every 1 s, every 5 s, every 1 min, etc.). If the controller 112 determines that the reference temperature is below the condensation temperature, the controller 112 commands the cylinder actuation system 118 to operate the engine 102 in a CDA operating mode at process 508. The CDA operating mode may be a predetermined operating mode. For example, the CDA operating mode may be a fixed cylinder operating mode where four of six total cylinders 104 of an engine 102 are active. In some embodiments, the controller 112 may determine a CDA operating mode as described in reference to FIG. 4. After the CDA operating mode is activated, the CDA operating mode is continued until the controller 112 determines that the reference temperature is at or above the condensation temperature. In some embodiments, the CDA operating mode may operate until the threshold temperature is an amount (e.g., 5%, 10%, 15%, etc.) above the condensation temperature to provide a temperature buffer.

Figure 6:
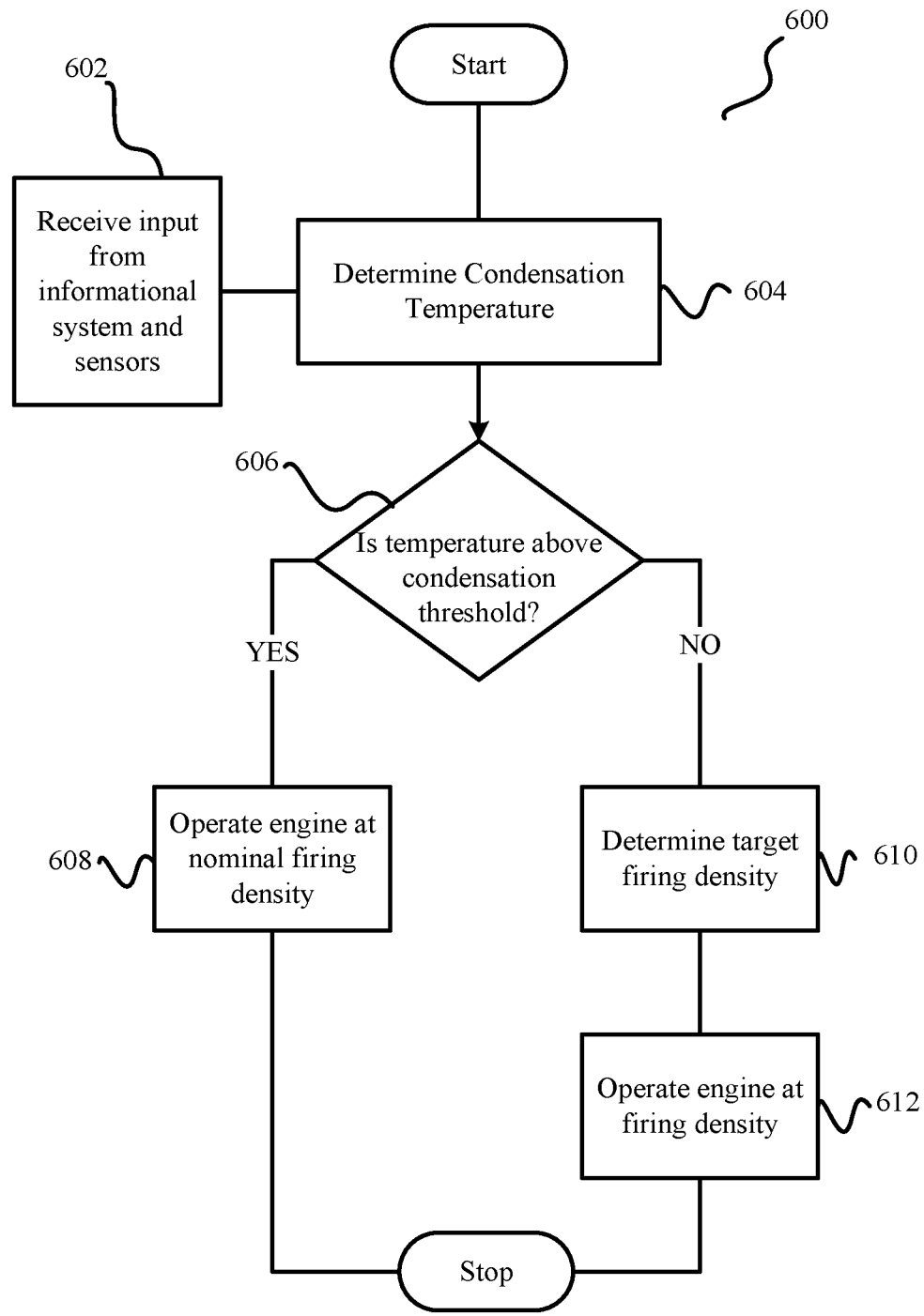
FIG. 6 is another flow diagram of a method for operating a cylinder deactivation operating mode for an engine to minimize condensation in an exhaust system coupled to an engine, according to another exemplary embodiment.

Referring now to FIG. 6, another flow diagram of a dynamic response method 600 for operating a cylinder deactivation operating mode for an engine to minimize condensation in an exhaust system of the engine is shown, according to another exemplary embodiment. The dynamic response method 600 utilizes additional data and information to determine whether a controller 112 should operate the engine 102 in a CDA operating mode.

At process 602, the controller 112 receives inputs from the sensors 110 and the informational system 114. The inputs correspond to measurements of characteristics of the exhaust gas and the components of the engine 102 and the exhaust aftertreatment system 108 and to information regarding the location, state, position, etc. of the system 100 as determined by the informational system 114. Alternatively, the controller 112 may determine this information without utilization of the informational system 114. The controller 112 may receive inputs that are measured or estimated, such as ambient temperature, ambient pressure, ambient humidity, engine exhaust temperature, flow-rate within an engine, exhaust condensation state information, or the like.

At process 604, the controller 112 determines a condensation temperature. The condensation temperature corresponds to an exhaust gas temperature (or, in some embodiments, a temperature of the exhaust aftertreatment system 108 components) that may result in a condensation state being present within the exhaust aftertreatment system 108. The determination of the condensation state is based on the inputs received in process 602.

At process 606, the controller 112 determines whether a reference temperature is above the condensation threshold determined at process 604. The reference temperature may be the actual or estimated temperature of exhaust gas leaving the engine 102 and/or a temperature within the exhaust aftertreatment system 108. More generally, process 604 determines whether a condensation state is present in the exhaust aftertreatment system 108 based on the inputs received in process 602 and the determined condensation temperature.

If the controller 112 determines that a condensation state is not present, the controller 112 commands the cylinder actuation system 118 to operate the engine 102 at a nominal (e.g., all cylinders are active) firing density in standard (non-CDA) operating mode at process 608. In some embodiments, the dynamic response method 600 returns to process 602 immediately or after a predetermined amount of time.

If the controller 112 determines that the reference temperature is below the condensation temperature and, thus, a condensation state is present, the controller 112 determines a target firing density and corresponding CDA operating mode at process 610. The target firing density is determined as the firing density of a CDA operating mode that may increase the exhaust temperature by enough to alleviate the condensation state. The target firing density may be specific to the CDA operating mode (e.g., fixed cylinder, dynamic skip-fire, etc.).

At process 612, the controller 112 commands the cylinder actuation system 118 to operate the engine 102 at the target firing density and the corresponding determined CDA operating mode. After the CDA operating mode is activated, the CDA operating mode is continued until the controller 112 determines that the reference temperature is at or above the condensation temperature. In some embodiments, the CDA operating mode may operate until the condensation temperature is an amount (e.g., 5%, 10%, 15%, etc.) above the condensation temperature to provide a temperature buffer. In some embodiments, if the condensation state is still present after a predetermined amount of time, the controller 112 may determine a CDA operating mode with fewer active cylinders 104 (i.e., reduce the firing density), thus increasing the temperature of the exhaust gas. Reducing the number of active cylinder 104 may repeat until the condensation state is no longer or likely no longer present.

As utilized herein with respect to numerical ranges, the terms "approximately," "about," "substantially," and similar terms generally mean+/−10% of the disclosed values. When the terms "approximately," "about," "substantially," and similar terms are applied to a structural feature (e.g., to describe its shape, size, orientation, direction, etc.), these terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled direction to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that circuit A communicates directly with circuit B (i.e., no intermediary) or communicates indirectly with circuit B (e.g., through one or more intermediaries).

While circuits with particular functionality is shown in FIG. 2, it should be understood that the controller 112 may include any number of circuits for completing the functions described herein. For example, the activities and functionalities of certain circuits may be combined in multiple circuits or as a single circuit. Additional circuits with additional functionality may also be included. Further, the controller 112 may further control other activity beyond the scope of the present disclosure.

As mentioned above and in one configuration, the "circuits" may be implemented in machine-readable medium storing instructions for execution by various types of processors, such as the processor 202. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., a local computing system, etc.) or remotely (e.g., as part of a remote server such as a cloud based server). To that end, a "circuit" as described herein may include components that are distributed across one or more locations.

Embodiments within the scope of the present disclosure include program products comprising computer or machine-readable media for carrying or having computer or machine-executable instructions or data structures stored thereon. Such machine-readable media can be any available media that can be accessed by a computer. The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device. Machine-executable instructions include, for example, instructions and data which cause a computer or processing machine to perform a certain function or group of functions.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present disclosure may be written in any combination of one or more other programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims. Additionally, any element disclosed in one embodiment may be incorporated or utilized with any other embodiment disclosed herein.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A system comprising:
an exhaust aftertreatment system; and
a controller coupled to an engine and the exhaust aftertreatment system, the controller configured to:
receive information comprising at least one of environmental information or operating information regarding the system;
determine that a condensation state is present in the exhaust aftertreatment system based on the information; and
responsive to determining that the condensation state is present, command the engine to operate in a cylinder deactivation mode whereby at least one cylinder of a plurality of cylinders of the engine is deactivated.

2. The system of claim 1, wherein the controller is further configured to:
receive location information regarding the system;
determine that the system is in a location associated with engine idle operation; and
based on determining that the system is in the location associated with the engine idle operation, continue to control the engine to operate in the cylinder deactivation mode.

3. The system of claim 1, wherein the controller is further configured to:
receive information regarding a time of operation of the system; and
determine that the time of operation is at or above a predefined operation time threshold, and continue to control the engine to operate in the cylinder deactivation mode.

4. The system of claim 3, wherein the controller is further configured to continue to control the engine to operate in the cylinder deactivation mode based on a location of the system being associated with engine idle operation and the time of operation being at or above the predefined operation time threshold.

5. The system of claim 3, wherein the predefined operation time threshold is less than a regulated threshold.

6. The system of claim 1, wherein the system is disposed in a vehicle.

7. The system of claim 1, wherein the controller is further configured to:
determine condensation threshold data based on the information, the condensation threshold data including at least one of a condensation temperature or a condensation pressure; and
determine a likelihood of condensation forming within the exhaust aftertreatment system based on the condensation threshold data.

8. The system of claim 1, wherein the controller is further configured to:
determine a condensation temperature based on the information;
determine a reference temperature based on the information; and
determine that the condensation state is present responsive to determining that the reference temperature is below the condensation temperature.

9. The system of claim 1, wherein determining that the condensation state is present includes:
determining a reference temperature; and
determining whether the reference temperature is below a reference threshold.

10. The system of claim 1, wherein the controller is further configured to:
determine a temperature regarding the exhaust aftertreatment system based on the information;
compare the temperature regarding the exhaust aftertreatment system to the condensation temperature; and
determine a firing density for the cylinder deactivation mode for the engine based on the comparison.

11. The system of claim 10, wherein the controller is further configured to:
determine that the firing density is a first firing density when the comparison indicates that the temperature regarding the exhaust aftertreatment system is within a predefined amount of the condensation temperature; and
determine that the first firing density is a second firing density when the comparison indicates that the temperature regarding the exhaust aftertreatment system is outside the predefined amount of the condensation temperature;
wherein the second firing density corresponds with less amount of cylinders being active during the cylinder deactivation mode relative to the first firing density.

12. A method, comprising:
receiving environmental information regarding a system comprising an engine coupled to an exhaust aftertreatment system;
receiving information comprising at least one of environmental information or an operating information regarding the system;
determining that a condensation state is present in the exhaust aftertreatment system based on information; and
responsive to determining that the condensation state is present, commanding the engine to operate in a cylinder deactivation mode whereby at least one cylinder of a plurality of cylinders of the engine is deactivated.

13. The method of claim 12, further comprising:
determining a temperature regarding the exhaust aftertreatment system based on the information;
comparing the temperature regarding the exhaust aftertreatment system to the condensation temperature; and
determining a firing density for the cylinder deactivation mode for the engine based on the comparison.

14. The method of claim 13, further comprising:
determining that the firing density is a first firing density when the comparison indicates that the temperature regarding the exhaust aftertreatment system is within a predefined amount of the condensation temperature; and
determining that the first firing density is a second firing density when the comparison indicates that the temperature regarding the exhaust aftertreatment system is outside the predefined amount of the condensation temperature;
wherein the second firing density corresponds with less amount of cylinders being active during the cylinder deactivation mode relative to the first firing density.

15. The method of claim 12, wherein the cylinder deactivation mode is a skip-fire cylinder deactivation mode.

16. A system, comprising:
at least one processor; and
at least one memory coupled to the at least one processor, the at least one memory storing instructions therein that, when executed by the at least one processor, cause the at least one processor to perform operations comprising:

receiving environmental information regarding the system;

receiving information regarding a temperature associated with an exhaust aftertreatment system;

determining a condensation temperature regarding the exhaust aftertreatment system based on at least one of an environmental information or the temperature regarding the exhaust aftertreatment system;

comparing the temperature regarding the exhaust aftertreatment system to the condensation temperature;

determining a firing density for a cylinder deactivation mode for an engine coupled to the exhaust aftertreatment system based on the comparison; and implementing the determined firing density with the engine during the cylinder deactivation mode.

17. The system of claim 16, wherein the operations further comprise:

receiving a temperature regarding the exhaust aftertreatment system subsequent to implementing the determined firing density with the engine during the cylinder deactivation mode; and ceasing operation of the cylinder deactivation mode based on the temperature regarding the exhaust aftertreatment system subsequent to implementing the determined firing density with the engine during the cylinder deactivation mode exceeding the condensation temperature.

18. The system of claim 16, wherein the system is included in at least one of a vehicle or a genset.

19. The system of claim 16, wherein the operations further comprise:

receiving a temperature regarding the exhaust aftertreatment system subsequent to implementing the determined firing density with the engine during the cylinder deactivation mode;

determining that the temperature regarding the exhaust aftertreatment system subsequent to implementing the determined firing density with the engine during the cylinder deactivation mode is less than the condensation temperature by more than a predefined amount after a predefined amount of time subsequent to implementing the determined firing density with the engine during the cylinder deactivation mode; and reducing the firing density based on the determination that the temperature regarding the exhaust aftertreatment system subsequent to implementing the determined firing density with the engine during the cylinder deactivation mode is less than the condensation temperature by more than the predefined amount after the predefined amount of time subsequent to implementing the determined firing density with the engine during the cylinder deactivation mode.

20. The system of claim 16, wherein the operations further comprise:

activating a heater in the exhaust aftertreatment system;

commanding hydrocarbon dosing in the exhaust aftertreatment system; or commanding post-injection dosing in at least one cylinder of the engine.

* * * * *